US010928107B2

(12) United States Patent
Schmidt et al.

(10) Patent No.: US 10,928,107 B2
(45) Date of Patent: Feb. 23, 2021

(54) METHOD FOR OPERATING A VAPOUR COMPRESSION SYSTEM WITH HEAT RECOVERY (71) Applicant: DANFOSS A/S, Nordborg (DK)

(72) Inventors: Frede Schmidt, Sønderborg (DK); Kristian Fredslund, Haderslev (DK); Jan Prins, Havnbjerg (DK)

(73) Assignee: Danfoss A/S, Nordborg (DK)

( * ) Notice: Subject to any disclaimer, the term of this patent is extended or adjusted under 35 U.S.C. 154(b) by 275 days.

(21) Appl. No.: 15/577,916

(22) PCT Filed: May 25, 2016

(86) PCT No.: PCT/EP2016/061736
§ 371 (c)(1),
(2) Date: Nov. 29, 2017

(87) PCT Pub. No.: WO2016/198258
PCT Pub. Date: Dec. 15, 2016

(65) Prior Publication Data
US 2018/0164004 A1 Jun. 14, 2018

(30) Foreign Application Priority Data
Jun. 8, 2015 (DK) .............................. PA201500327

(51) Int. Cl.
*F25B 29/00* (2006.01)
*F25B 1/10* (2006.01)
(Continued)

(52) U.S. Cl.
CPC .............. *F25B 29/003* (2013.01); *F25B 1/10* (2013.01); *F25B 40/04* (2013.01); *F25B 49/022* (2013.01);
(Continued)

(58) Field of Classification Search
CPC ...... F25B 29/003; F25B 29/00; F25B 49/022; F25B 49/02; F25B 40/04; F25B 1/10; F25B 2400/075; F25B 2400/13; F25B 2400/23
See application file for complete search history.

(56) References Cited

U.S. PATENT DOCUMENTS 4,299,664 A    11/1981   Smith
4,316,367 A    2/1982   Yaeger et al.
(Continued)

FOREIGN PATENT DOCUMENTS

CN     102840714 A   *   12/2012
CN     102840714 A     12/2012
(Continued)

OTHER PUBLICATIONS

Translation CN 102840714A.*
(Continued)

*Primary Examiner* — Elizabeth J Martin
(74) *Attorney, Agent, or Firm* — McCormick, Paulding & Huber PLLC (57) ABSTRACT A method for operating a vapour compression system (1) comprising a heat recovery heat exchanger (4) is disclosed. The heat recovery system requests a required level of recovered heat to be provided by the heat recovery heat exchanger (4) to the heat recovery system, generates a signal indicating the required level of recovered heat, and supplies the generated signal to a control unit of the vapour compression system (1). A setpoint value for at least one control parameter of the vapour compression system (1) is calculated, based on the generated signal, and the vapour compression system (1) is operated in accordance with the calculated setpoint value(s).

17 Claims, 7 Drawing Sheets

(51) Int. Cl.
 *F25B 40/04* (2006.01)
 *F25B 49/02* (2006.01)
(52) U.S. Cl.
 CPC ..... *F25B 2400/075* (2013.01); *F25B 2400/13* (2013.01); *F25B 2400/23* (2013.01); *Y02B 30/52* (2013.01)

(56) References Cited

U.S. PATENT DOCUMENTS

| | | |
|---|---|---|
| 4,711,094 A | 12/1987 | Ares et al. |
| 4,751,823 A | 6/1988 | Hans |
| 2008/0041071 A1 | 2/2008 | Itoh |
| 2009/0120110 A1 | 5/2009 | Grabon et al. |
| 2012/0151946 A1* | 6/2012 | Decaestecker ........ F25B 29/003 62/79 |
| 2015/0345846 A1* | 12/2015 | Kopko ................... F25B 49/02 62/115 |

FOREIGN PATENT DOCUMENTS

| | | |
|---|---|---|
| EP | 2 184 563 A1 | 5/2010 |
| GB | 2517216 A | 2/2015 |
| WO | 2013029687 A1 | 3/2013 |

OTHER PUBLICATIONS

Search Report for Danish Serial No. PA 2015 00327 dated Nov. 25, 2015.
International Search Report for PCT Serial No. PCT/EP2016/061736 dated Aug. 12, 2016.

* cited by examiner

METHOD FOR OPERATING A VAPOUR COMPRESSION SYSTEM WITH HEAT RECOVERY

CROSS-REFERENCE TO RELATED APPLICATIONS

This application is a National Stage application of International Patent Application No. PCT/EP2016/061736, filed on May 25, 2016, which claims priority to Danish Patent Application No. PA201500327, filed on Jun. 8, 2015, each of which is hereby incorporated by reference in its entirety.

TECHNICAL FIELD

The present invention relates to a method for operating a vapour compression system comprising a heat recovery heat exchanger being arranged to recover heat from refrigerant flowing in a refrigerant path of the vapour compression system, and to provide the recovered heat to a heat recovery system. The method of the invention allows the vapour compression system to be operated in such manner that the recovered heat provided to the heat recovery system is adjusted to meet specific demands of the heat recovery system.

BACKGROUND

In vapour compression systems a fluid medium, such as a refrigerant, is alternatingly compressed and expanded, while heat exchange takes place at a heat rejecting heat exchanger, such as a condenser or a gas cooler, and at a heat absorbing heat exchanger, such as an evaporator. Accordingly, the vapour compression system may provide heating or cooling. In the case that the vapour compression system is primarily used for providing cooling or refrigeration, the heat rejected from the refrigerant via the heat rejecting heat exchanger is in principle lost or wasted. Therefore, such vapour compression systems are sometimes provided with a heat recovery system, which recovers at least some of the rejected heat, and uses it for fulfilling heating requirements at the site of the vapour compression system, e.g. in the form of room heating and/or heating of domestic water. Thereby the total energy consumption required in order to satisfy the combined refrigeration and heating demand at the premises can be reduced.

US 2009/0120110 discloses a refrigeration system and a method for providing controllable amounts of heat recovery from a refrigerant circuit. A cooling circuit comprises a compressor, a condenser, an expansion device and an evaporator connected in series by refrigerant flow lines. A heat recovery circuit comprising a heat recovery heat exchanger is connected to the cooling circuit so that the heat recovery heat exchanger is in parallel with the condenser, and the heat recovery heat exchanger is in heat exchange relationship with a fluid to be heated. Refrigerant is selectively directed through the condenser of the cooling circuit or through the heat recovery heat exchanger of the heat recovery circuit so as to maintain temperature of the fluid within a temperature hand around a setpoint provided by the end user.

SUMMARY

It is an object of embodiments of the invention to provide a method for controlling heat recovery from a vapour compression system in order to obtain a required level of recovered heat.

According to a first aspect the invention provides a method for operating a vapour compression system, the vapour compression system comprising a compressor unit comprising one or more compressors, a heat recovery heat exchanger, a heat rejecting heat exchanger, an expansion device and an evaporator arranged along a refrigerant path, the heat recovery heat exchanger being arranged to recover heat from refrigerant flowing in the refrigerant path and to provide the recovered heat to a heat recovery system, the method comprising the steps of:

the heat recovery system requesting a required level of recovered heat to be provided by the heat recovery heat exchanger to the heat recovery system, generating a signal indicating the required level of recovered heat, and supplying the generated signal to a control unit of the vapour compression system, calculating a setpoint value for at least one control parameter of the vapour compression system, based on the generated signal, and operating the vapour compression system in accordance with the calculated setpoint value(s).

The method according to the first aspect of the invention is for operating a vapour compression system. In the present context the term 'vapour compression system' should be interpreted to mean any system in which a fluid medium, such as a refrigerant, circulates and is alternatingly compressed and expanded, thereby providing either refrigeration or heating of a volume. Thus, the vapour compression system may be a refrigeration system, an air condition system, a heat pump, etc.

The vapour compression system comprises a compressor unit, comprising one or more compressors, a heat recovery heat exchanger, a heat rejecting heat exchanger, an expansion device, e.g. in the form of an expansion valve, and an evaporator arranged along a refrigerant path. The heat recovery heat exchanger is arranged to recover heat from the refrigerant flowing in the refrigerant path and to provide the recovered heat to a heat recovery system. The heat recovery system may, e.g., be or form part of a domestic heating system, i.e. a system which provides room heating and/or heating of domestic water. Accordingly, the vapour compression system being controlled by means of the method according to the first aspect of the invention is of a kind which is capable of providing heat recovery.

Refrigerant flowing in the refrigerant path is compressed by the compressors of the compressor unit. The compressed refrigerant is supplied to the heat recovery heat exchanger, where heat exchange takes place with a heat recovery fluid, thereby recovering heat from the refrigerant and supplying it to the heat recovery system. The refrigerant is then passed to the heat rejecting heat exchanger, where heat exchange also takes place with the ambient, in such a manner that heat is rejected from the refrigerant to the ambient. In the case that the heat rejecting heat exchanger is in the form of a condenser, the refrigerant is at least partly condensed when passing through the heat rejecting heat exchanger. In the case that the heat rejecting heat exchanger is in the form of a gas cooler, the refrigerant passing through the heat rejecting heat exchanger is cooled, but remains in a gaseous phase.

It should be noted that the vapour compression system may further be provided with a first bypass path, bypassing the heat recovery heat exchanger, and/or with a second bypass path, bypassing the heat rejecting heat exchanger. In this case each bypass path should preferably be provided with an appropriate bypass valve arrangement for controlling whether refrigerant should pass through the bypass path or through the associated heat exchanger. Thus, in this case it is possible to control the vapour compression system in such a manner that the heat recovery heat exchanger and/or the heat rejecting heat exchanger is/are bypassed. However, since the heat recovery heat exchanger and the heat rejecting heat exchanger are arranged in series in the refrigerant path, refrigerant will pass sequentially through both of these heat exchangers when no bypass path is open.

The refrigerant leaving the heat rejecting heat exchanger is supplied to the expansion device, where it undergoes expansion before being supplied to the evaporator. The refrigerant being supplied to the evaporator is thereby in a mixed liquid and gaseous phase. When passing through the evaporator the liquid part of the refrigerant is at least partly evaporated, while heat exchange takes place between the refrigerant and the ambient in such a manner that heat is absorbed by the refrigerant from the ambient. Finally, the refrigerant is once again supplied to the compressors of the compressor unit.

Thus, refrigerant flowing in the refrigerant path is alternatingly compressed by the compressors of the compressor unit and expanded by the expansion device, while heat exchange takes place at the heat recovery heat exchanger, the heat rejecting heat exchanger and the evaporator. For instance, the evaporator may be arranged in contact with a refrigerated volume, such as a display case in a supermarket. Furthermore, the vapour compression system may comprise two or more evaporators arranged in parallel along the refrigerant path, each evaporator being arranged in contact with a separate display case. In this case the heat recovery system may advantageously be used for providing room heating and/or heating of tap water at the premises of the vapour compression system.

The refrigerant flowing in the refrigerant path of the vapour compression system may, e.g., be a transcritical refrigerant, such as $CO_2$. As an alternative, the refrigerant may be any other suitable, transcritical or subcritical, refrigerant.

In the method according to the first aspect of the invention, the heat recovery system initially requests a required level of recovered heat to be provided by the heat recovery heat exchanger to the heat recovery system. Accordingly, the heat recovery system defines a level of recovered heat, which it needs to receive from the heat recovery heat exchanger, e.g. based on a demand of one or more heat consumers of the heat recovery system. Thus, the heat recovery system requests the vapour compression system to provide recovered heat, via the heat recovery heat exchanger, to an extent which meets the demand of the heat consumers of the heat recovery system.

Furthermore, the heat recovery system generates a signal which indicates the required level of recovered heat and supplies the generated signal to a control unit of the vapour compression system. Thus, the control unit of the vapour compression system receives a signal which indicates the required level of recovered heat, which was defined by the heat recovery system.

Next, a setpoint value for at least one control parameter of the vapour compression system is calculated, based on the generated signal. Since the setpoint value is calculated based on the generated signal, it is based on the required level of recovered heat which was requested by the heat recovery system. Thereby the calculated setpoint value can be expected to be such that, if the vapour compression system is operated in such a manner that the corresponding control parameter reaches a value which is substantially equal to the setpoint value, then the heat recovery heat exchanger will provide the required level of recovered heat to the heat recovery system. Accordingly, the calculated setpoint value specifies how to operate the vapour compression system, with regard to the corresponding control parameter, in order to obtain the required level of recovered heat.

The setpoint value may, e.g., be calculated by the control unit of the vapour compression system. As an alternative, the setpoint value may be calculated by another suitable unit, preferably being arranged to communicate with the control unit of the vapour compression system.

Finally, the vapour compression system is operated in accordance with the calculated setpoint value(s). Thus, the vapour compression system is operated in such a manner that, for each of the relevant control parameter(s), it is attempted to reach a value for the control parameter which is substantially equal to the corresponding calculated setpoint value. Thereby it is obtained, that the vapour compression system is operated in such a manner that the heat recovery heat exchanger provides the required and requested level of recovered heat to the heat recovery system.

Thus, when operating the vapour compression system in accordance with the method according to the first aspect of the invention, not only the energy efficiency of the refrigerating part of the system is taken into account, but also the energy efficiency of the heating system of the premises of the vapour compression system. Thereby the vapour compression system is operated in a manner which meets the refrigeration requirements as well as the heating requirements of the premises of the vapour compression system in a manner which is as energy efficient as possible.

One of the control parameter(s) may be a pressure prevailing inside the heat rejecting heat exchanger, and the step of operating the vapour compression system may comprise operating the vapour compression system in order to adjust the pressure prevailing inside the heat rejecting heat exchanger to reach a pressure which is equal to the calculated setpoint value for the pressure prevailing inside the heat rejecting heat exchanger.

According to this embodiment, the vapour compression system is operated in order to obtain the required level of recovered heat, on the basis of the pressure prevailing inside the heat rejecting heat exchanger. When the pressure inside the heat rejecting heat exchanger is relatively high, so are the pressure of refrigerant passing the heat recovery heat exchanger and the pressure of refrigerant leaving the compressor unit. Thereby the temperature of the refrigerant passing through the heat recovery heat exchanger and the heat rejecting heat exchanger, respectively, is also relatively high, and it is possible to provide a relatively high heat transfer in the heat recovery heat exchanger. Furthermore, the enthalpy of the refrigerant leaving the heat recovery heat exchanger is relatively low when the pressure prevailing inside the heat rejecting heat exchanger is relatively high, thereby allowing a relatively high heat transfer in the heat recovery heat exchanger.

On the other hand, when the pressure inside the heat rejecting heat exchanger is relatively low, it is only possibly to provide a relatively low heat transfer in the heat recovery heat exchanger, for similar reasons. It is therefore possible to adjust the heat transfer taking place in the heat rejecting heat exchanger, and thereby the level of recovered heat provided by the heat recovery heat exchanger, by appropriately adjusting the pressure prevailing inside the heat rejecting heat exchanger.

The pressure prevailing inside the heat rejecting heat exchanger may, e.g., be adjusted by adjusting a speed of a fan arranged to cause an air flow across the heat rejecting heat exchanger and/or by operating a high pressure valve arranged downstream relative to the outlet of the heat rejecting heat exchanger.

Alternatively or additionally, one of the control parameter(s) may be a temperature of refrigerant leaving the heat rejecting heat exchanger, and the step of operating the vapour compression system may comprise operating the vapour compression system in order to adjust the temperature of refrigerant leaving the heat rejecting heat exchanger to reach a temperature which is equal to the calculated setpoint value for the temperature of refrigerant leaving the heat rejecting heat exchanger.

According to this embodiment, the vapour compression system is operated in order to obtain the required level of recovered heat, on the basis of the temperature of refrigerant leaving the heat rejecting heat exchanger. When the temperature of refrigerant leaving the heat rejecting heat exchanger is relatively high, the cooling capacity of the vapour compression system is relatively low. This has the consequence that the mass flow rate of refrigerant circulating the vapour compression system is relatively high, resulting in a relatively high heat transfer in the heat recovery heat exchanger. It is therefore possible to adjust the heat transfer taking place in the heat rejecting heat exchanger, and thereby the level of recovered heat provided by the heat recovery heat exchanger, by appropriately adjusting the temperature of refrigerant leaving the heat rejecting heat exchanger.

The temperature of refrigerant leaving the heat rejecting heat exchanger may, e.g., be adjusted by adjusting a speed of a fan arranged to cause an air flow across the heat rejecting heat exchanger.

Alternatively or additionally, one of the control parameter(s) may be a superheat of refrigerant entering the compressor unit, and the step of operating the vapour compression system may comprise operating the vapour compression system in order to adjust the superheat of refrigerant entering the compressor unit to reach a superheat value which is equal to the calculated setpoint value for the superheat of refrigerant entering the compressor unit.

According to this embodiment, the vapour compression system is operated in order to obtain the required level of recovered heat, on the basis of the superheat of refrigerant entering the compressor unit. In the present context the term 'superheat' should be interpreted to mean a temperature difference between the dew point of the refrigerant and the actual temperature of the refrigerant. Since the dew point of the refrigerant depends on the pressure of the refrigerant, the superheat can normally be derived from measurements of the temperature and the pressure of the refrigerant, based on knowledge regarding which refrigerant is applied in the vapour compression system.

When the superheat of refrigerant entering the compressor unit is relatively high, then the temperature of refrigerant entering the compressor unit is also relatively high. Thereby the temperature of refrigerant leaving the compressor unit and entering the heat recovery heat exchanger is also relatively high, and it is possible to provide a relatively high heat transfer in the heat recovery heat exchanger, for similar reasons as described above. Similarly, a relatively low superheat of refrigerant entering the compressor unit results in a relatively low temperature of refrigerant being supplied to the heat recovery heat exchanger, and thereby in a relatively low heat transfer in the heat recovery heat exchanger. It is therefore possible to adjust the heat transfer taking place in the heat rejecting heat exchanger, and thereby the level of recovered heat provided by the heat recovery heat exchanger, by appropriately adjusting the superheat of refrigerant entering the compressor unit.

The superheat of refrigerant entering the compressor unit may, e.g., be adjusted by adjusting a supply of refrigerant from a liquid outlet of a receiver to a part of the refrigerant path interconnecting the outlet of the evaporator and the inlet of the compressor unit, thereby bypassing the expansion device and the evaporator. When the liquid refrigerant from the receiver is mixed with the gaseous refrigerant from the outlet of the evaporator, the liquid refrigerant is heated by the gaseous refrigerant, and the liquid refrigerant will evaporate. As a consequence, the gaseous refrigerant from the outlet of the evaporator is cooled, i.e. the superheat of the refrigerant is decreased. Therefore, increasing the bypass flow will decrease the superheat of refrigerant entering the compressor unit, and decreasing the bypass flow will increase the superheat of refrigerant entering the compressor unit.

The step of the heat recovery system requesting a required level of recovered heat may comprise generating a signal indicating a fraction of a maximum available recoverable heat under maximum refrigeration load conditions, corresponding to the required level of recovered heat. According to this embodiment, a relative level of recovered heat is requested, rather than an absolute level of recovered heat. Thereby the request for a required level of heat recovery takes the operating conditions of the vapour compression system into account, thereby ensuring that the vapour compression system is actually capable of providing the requested level of recovered heat to the heat recovery system.

The step of calculating a setpoint value may comprise establishing a model of a part of the vapour compression system which is related to the control parameter(s), and calculating the setpoint value using the established model. The model may, e.g., reflect thermodynamic conditions prevailing in the part of the vapour compression system which is related to the control parameter(s). The model may thereby appropriately reflect the relationship between the relevant control parameter(s) and the level of recovered heat, even if this relationship is not linear. Thereby the calculated setpoint value(s) correspond(s) to the level of recovered heat in an accurate manner.

Alternatively or additionally, the step of calculating a setpoint value may comprise the steps of:
    calculating a mass flow rate through the compressor unit,
    calculating an enthalpy per unit mass required in order to provide the requested level of recovered heat, at the calculated mass flow rate through the compressor unit, and
    calculating a setpoint value for at least one control parameter which provides the calculated enthalpy per unit mass.

According to this embodiment, the setpoint value is calculated, based on the generated signal, in the following manner. A mass flow rate through the compressor unit is calculated. This may, e.g., be done by determining the density, temperature and pressure of the refrigerant at the inlet of the compressor unit, and calculating the mass flow rate of refrigerant through the compressor unit, based on the obtained parameters. The calculated mass flow rate represents the amount of refrigerant per unit time being compressed by the compressor(s) of the compressor unit and supplied to the heat recovery heat exchanger, under the given operating conditions. Accordingly, the calculated mass flow rate further represents the current capacity of the compressor(s) of the compressor unit.

Furthermore, an enthalpy per unit mass, which is required in order to provide the requested level of recovered heat, is calculated, given that the mass flow rate through the compressor unit is as calculated in the manner described above. This may, e.g., be done by dividing the requested level of recovered heat, as indicated by the signal received from the heat recovery system, by the calculated mass flow rate through the compressor unit. The enthalpy per unit mass represents the amount of heat which the heat recovery heat exchanger must be able to provide to the heat recovery system, under the given operating conditions, including the current capacity of the compressor unit.

Finally a setpoint value is calculated for at least one control parameter. The setpoint value is calculated in such a manner that when the corresponding control parameter has a value which is substantially equal to the calculated setpoint value, then the heat recovery heat exchanger will be able to provide the calculated enthalpy per unit mass.

According to one embodiment, the vapour compression system may further comprise a receiver having an inlet connected to an outlet of the heat rejecting heat exchanger, a gaseous outlet and a liquid outlet, and the compressor unit may comprise one or more compressors having an inlet connected to an outlet of the evaporator and one or more compressors having an inlet connected to the gaseous outlet of the receiver, the gaseous outlet of the receiver further being connectable to a part of the refrigerant path interconnecting the outlet of the evaporator and the inlet of the compressor unit, via a bypass valve. In this case the method may further comprise the steps of:

calculating a setpoint value for a mass flow of refrigerant from the gaseous outlet of the receiver towards the part of the refrigerant path interconnecting the outlet of the evaporator and the inlet of the compressor unit, based on the generated signal, and operating the bypass valve in accordance with the calculated setpoint value for the mass flow of refrigerant.

According to this embodiment, the vapour compression system is of a kind which comprises a receiver, where the refrigerant leaving the heat rejecting heat exchanger is separated into a gaseous part and a liquid part. Gaseous refrigerant can be supplied directly from the receiver to an inlet of a dedicated receiver compressor, while the liquid part of the refrigerant is supplied from the receiver to the expansion device. The gaseous refrigerant which is supplied directly from the receiver to the dedicated receiver compressor does not undergo the expansion which takes place in the expansion device, and the work required by the receiver compressor in order to compress this part of the refrigerant is therefore reduced as compared to the work required in order to compress the refrigerant which has passed through the expansion device and the evaporator. However, it may also be possible to supply the gaseous refrigerant from the receiver to the compressor(s) of the compressor unit which are also receiving refrigerant from the evaporator. In the following these compressors will be referred to as main compressors. In this case the gaseous outlet of the receiver may be connected to a part of the refrigerant path interconnecting the outlet of the evaporator and the inlet of the main compressor(s), preferably via a controllable bypass valve. Thereby the gaseous refrigerant from the receiver is mixed with the refrigerant leaving the evaporator, before the mixed refrigerant is supplied to the main compressor(s).

When the gaseous refrigerant is supplied from the receiver to the dedicated receiver compressor(s), the refrigerant leaving the main compressor(s) is mixed with the refrigerant leaving the dedicated receiver compressor(s) before the refrigerant is supplied to the heat recovery heat exchanger. This has the consequence that the temperature of the refrigerant being supplied to the heat recovery heat exchanger is lower than the temperature of the refrigerant leaving the main compressor(s). Accordingly, the temperature of the refrigerant being supplied to the heat recovery heat exchanger can be adjusted by adjusting whether the gaseous refrigerant from the receiver is supplied to the dedicated receiver compressor(s) or to the main compressor(s). Since the temperature of the refrigerant being supplied to the heat recovery heat exchanger affects the level of recovered heat provided by the heat recovery heat exchanger, the level of recovered heat can thereby be adjusted by adjusting mass flow of refrigerant from the gaseous outlet of the receiver towards the part of the refrigerant path interconnecting the outlet of the evaporator and the inlet of the compressor unit. Accordingly, this mass flow is an appropriate control parameter for this purpose, and it is appropriate to calculate a setpoint value for this mass flow, based on the generated signal, and to operate the vapour compression system in order to obtain a mass flow which is substantially equal to the calculated setpoint value, thereby obtaining the requested level of recovered heat.

According to a second aspect the invention provides a method for operating a vapour compression system, the vapour compression system comprising a compressor unit comprising one or more compressors, a heat recovery heat exchanger, a heat rejecting heat exchanger, an expansion device and an evaporator arranged along a refrigerant path, the heat recovery heat exchanger being arranged to recover heat from refrigerant flowing in the refrigerant path and to provide the recovered heat to a heat recovery system, the method comprising the steps of:

the heat recovery system requesting an increase or a decrease in recovered heat to be provided by the heat recovery heat exchanger to the heat recovery system, generating a signal indicating the increase or decrease in recovered heat, and supplying the generated signal to a control unit of the vapour compression system, and adjusting a superheat of refrigerant entering the compressor unit, based on the generated signal, in order to provide the requested increase or decrease in recovered heat.

The vapour compression system being operated by means of the method according to the second aspect of the invention is similar to the vapour compression system being operated by means of the method according to the first aspect of the invention. The vapour compression system will therefore not be described in detail here, and the remarks set forth above regarding the vapour compression system with reference to the first aspect of the invention are equally applicable here.

In the method according to the second aspect of the invention, the heat recovery system initially requests an increase or a decrease in recovered heat to be provided by the heat recovery heat exchanger to the heat recovery system. This may include requesting a specific level of recovered heat, as described above with reference to the first aspect of the invention. Alternatively, the heat recovery system may request that the recovered heat is increased or decreased by a specific amount or by a specific percentage of the currently level of recovered heat, or simply that the level of recovered heat is increased or decreased, without specifying how much.

The heat recovery system further generates a signal indicating the increase or decrease in recovered heat, and supplies the generated signal to a control unit of the vapour compression system, similarly to the situation described above with reference to the first aspect of the invention.

Subsequently, a superheat of refrigerant entering the compressor unit is adjusted, based on the generated signal, in order to provide the requested increase or decrease in recovered heat.

As described above, adjusting the superheat of the refrigerant entering the compressor unit has an impact on the temperature of the refrigerant leaving the compressor unit and being supplied to the heat recovery heat exchanger, and thereby on the heat transfer taking place in the heat recovery heat exchanger. Therefore the level of recovered heat provided by the heat recovery heat exchanger to the heat recovery system can be adjusted in a desired manner by appropriately adjusting the superheat of refrigerant entering the compressor unit.

Thus, according to the second aspect the invention provides a method for operating a vapour compression system in which the heat recovery is controlled by controlling the superheat of refrigerant entering the compressor unit.

The step of adjusting a superheat of refrigerant entering the compressor unit may comprise controlling a valve arranged in a part of the refrigerant path which bypasses the evaporator. This has already been described above with reference to the first aspect of the invention.

According to a third aspect the invention provides a method for operating a vapour compression system, the vapour compression system comprising a compressor unit comprising one or more compressors, a heat recovery heat exchanger, a heat rejecting heat exchanger, a receiver, an expansion device and an evaporator arranged along a refrigerant path, the heat recovery heat exchanger being arranged to recover heat from refrigerant flowing in the refrigerant path and to provide the recovered heat to a heat recovery system, the receiver having an inlet connected to an outlet of the heat rejecting heat exchanger, a gaseous outlet and a liquid outlet, and wherein one or more of the compressor(s) of the compressor unit has/have an inlet connected to an outlet of the evaporator and one or more of the compressor(s) of the compressor unit has/have an inlet connected to the gaseous outlet of the receiver, the gaseous outlet of the receiver further being connectable to a part of the refrigerant path interconnecting the outlet of the evaporator and the inlet of the compressor unit, via a bypass valve, the method comprising the steps of:

the heat recovery system requesting an increase or a decrease in recovered heat to be provided by the heat recovery heat exchanger to the heat recovery system, generating a signal indicating the increase or decrease in recovered heat, and supplying the generated signal to a control unit of the vapour compression system, and
operating the bypass valve, based on the generated signal, in order to adjust a mass flow of refrigerant from the gaseous outlet of the receiver towards the part of the refrigerant path interconnecting the outlet of the evaporator and the inlet of the compressor unit, thereby providing the requested increase or decrease in recovered heat.

It should be noted that a person skilled in the art would readily recognise that any feature described in combination with the first aspect of the invention could also be combined with the second or the third aspect of the invention, that any feature described in combination with the second aspect of the invention could also be combined with the first or the third aspect of the invention, and that any feature described in combination with the third aspect of the invention could also be combined with the first or the second aspect of the invention.

The vapour compression system being operated by means of the method according to the third aspect of the invention is very similar to the vapour compression system being operated by means of the method according to the first aspect of the invention. The vapour compression system will therefore not be described in detail here, and the remarks set forth above in this regard with reference to the first aspect of the invention are also applicable here.

In the method according to the third aspect of the invention, the heat recovery system requests an increase or a decrease in recovered heat to be provided by the heat recovery heat exchanger to the heat recovery system, generates a signal indicating the increase or decrease in recovered heat, and supplies the generated signal to a control unit of the vapour compression system. This is very similar to the situation described above with reference to the second aspect of the invention, and the remarks set forth above in this regard are equally applicable here.

Next, the bypass valve is operated, based on the generated signal, and thereby based on whether an increase or a decrease in recovered heat is requested, and possibly how large an increase or decrease is requested. The bypass valve is operated in order to adjust a mass flow of refrigerant from the gaseous outlet of the receiver towards the part of the refrigerant path interconnecting the outlet of the evaporator and the inlet of the compressor unit, and in order to provide the requested increase or decrease in recovered heat.

As described above with reference to the first aspect of the invention, whether the gaseous refrigerant from the receiver is supplied to the dedicated receiver compressor(s) or to the main compressor(s) has an impact on the temperature of the refrigerant being supplied to the heat recovery heat exchanger, and thereby on the heat transfer taking place in the heat recovery heat exchanger. Therefore the level of recovered heat provided by the heat recovery heat exchanger to the heat recovery system can be adjusted in a desired way by appropriately adjusting the mass flow of refrigerant from the gaseous outlet of the receiver towards the part of the refrigerant path interconnecting the outlet of the evaporator and the inlet of the compressor unit, by appropriately operating the bypass valve.

Thus, according to the third aspect the invention provides a method for operating a vapour compression system in which the heat recovery is controlled by controlling the mass flow of refrigerant from the gaseous outlet of the receiver towards the part of the refrigerant path interconnecting the outlet of the evaporator and the inlet of the compressor unit.

BRIEF DESCRIPTION OF THE DRAWINGS

The invention will now be described in further detail with reference to the accompanying drawings in which.

DETAILED DESCRIPTION OF THE DRAWINGS

Figure 1:
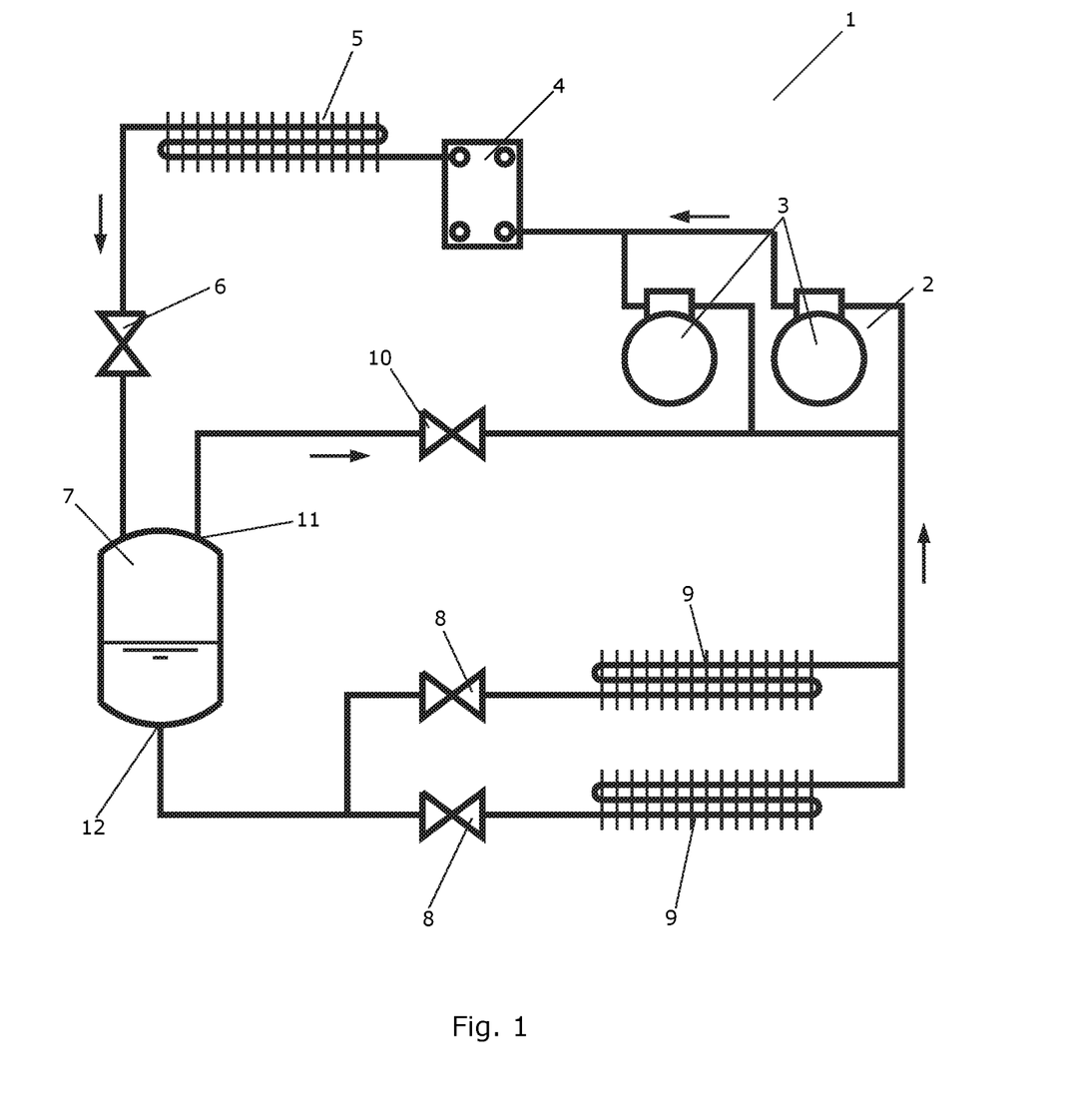
FIGS. 1-3 are diagrammatic views of three different vapour compression systems being operated by a method according to an embodiment of the invention.

FIG. 1 is a diagrammatic view of a vapour compression system 1 being operated according to an embodiment of the invention. The vapour compression system 1 comprises a compressor unit 2 comprising a number of compressors 3, two of which are shown, a heat recovery heat exchanger 4, a heat rejecting heat exchanger 5, a high pressure valve 6, a receiver 7, and two expansion devices 8, in the form of expansion valves, each being arranged to supply refrigerant to an evaporator 9, arranged along a refrigerant path. The evaporators 9 are arranged fluidly in parallel in the refrigerant path. The vapour compression system 1 further comprises a control valve 10 arranged in a part of the refrigerant path interconnecting a gaseous outlet 11 of the receiver and a part of the refrigerant path interconnecting the outlets of the evaporators 9 and the inlet of the compressor unit 2.

Refrigerant flowing in the refrigerant path is compressed by the compressors 3 of the compressor unit 2 before being supplied to the heat recovery heat exchanger 4. In the heat recovery heat exchanger 4 heat exchange takes place between the refrigerant and a secondary fluid flow, e.g. in the form of air or water which needs to be heated by means of recovered heat, and which forms part of a heat recovery system. Accordingly, the heat recovery heat exchanger 4 ensures that heat is recovered from the refrigerant and supplied to the heat recovery system.

The refrigerant is then supplied to the heat rejecting heat exchanger 5, where further heat exchange takes place between the refrigerant and the ambient, in such a manner that heat is rejected from the refrigerant. The heat rejecting heat exchanger 5 may be in the form of a condenser or in the form of a gas cooler.

Next, the refrigerant passes through the high pressure valve 6, where it undergoes expansion, before being supplied to the receiver 7. In the receiver 7 the refrigerant is separated into a liquid part and a gaseous part. The liquid part of the refrigerant is supplied to the expansion devices 8, via a liquid outlet 12. When passing through the expansion devices 8, the refrigerant undergoes expansion before being supplied to the evaporators 9. In the evaporators 9 the liquid part of the refrigerant is at least partly evaporated, while heat exchange takes place between the refrigerant and the ambient in such a manner that heat is absorbed by the refrigerant.

Subject to the control of the controllable valve 10, gaseous refrigerant may be supplied from the gaseous outlet 11 of the receiver 7 to the part of the refrigerant path interconnecting the outlets of the evaporators 9 and the inlet of the compressor unit 2, via the controllable valve 10. Thereby the gaseous refrigerant from the receiver 7 is mixed with the refrigerant leaving the evaporators 9, before the refrigerant is once again supplied to the compressors 3 of the compressor unit 2.

Accordingly, the refrigerant flowing in the refrigerant path is alternatingly compressed by the compressors 3 of the compressor unit 2 and expanded by the high pressure valve 6 and the expansion devices 8, while heat exchange takes place at the heat recovery heat exchanger 4, the heat rejecting heat exchanger 5 and the evaporators 9.

In the vapour compression system 1 of FIG. 1 the level of recovered heat provided by the heat recovery heat exchanger 4 to the heat recovery system can be adjusted by appropriately adjusting one or more control parameters of the vapour compression system 1, as described above. For instance, the level of recovered heat may be adjusted by adjusting a pressure prevailing in the heat rejecting heat exchanger 5 and/or a temperature of refrigerant leaving the heat rejecting heat exchanger 5, e.g. by adjusting the capacity of the compressors 3 of the compressor unit 2.

Figure 2:
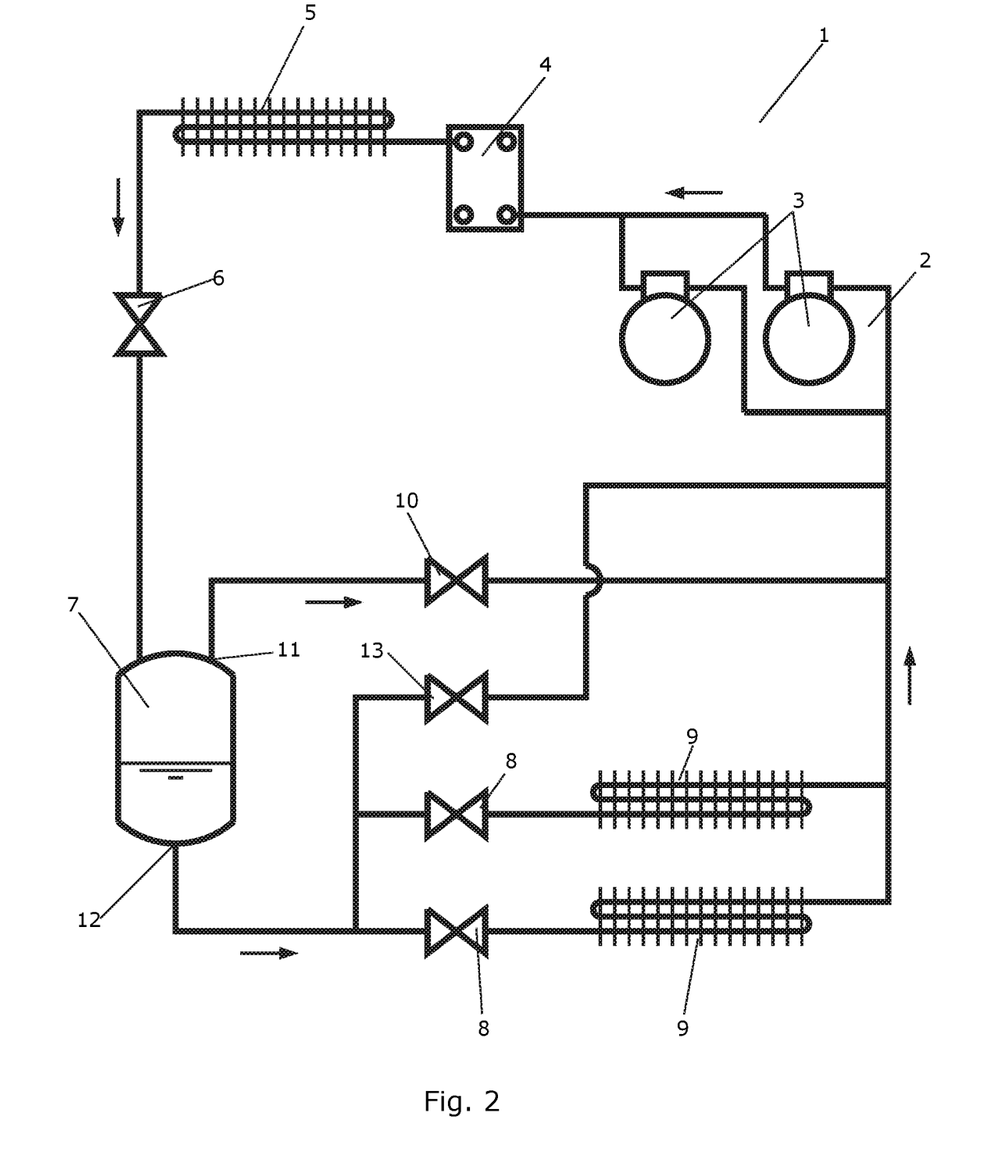

FIG. 2 is a diagrammatic view of an alternative vapour compression system 1 being operated according to an embodiment of the invention. The vapour compression system 1 of FIG. 2 is very similar to the vapour compression system 1 of FIG. 1, and it will therefore not be described in detail here.

The vapour compression system 1 of FIG. 2 is further provided with a bypass valve 13 interconnecting the liquid outlet 12 of the receiver 7 and the part of the refrigerant path which interconnects the outlets of the evaporators 9 and the inlet of the compressor unit 2. Thereby it is possible to bypass the expansion devices 8 and the evaporators 9, and allow liquid refrigerant to be supplied directly from the liquid outlet 12 of the receiver 7 to the part of the refrigerant path which interconnects the outlets of the evaporators 9 and the inlet of the compressor unit 2. This allows the superheat of refrigerant entering the compressor unit 2 to be controlled, as described above.

Thus, in the vapour compression system 1 of FIG. 2 the level of recovered heat provided by the heat recovery heat exchanger 4 to the heat recovery system can be adjusted by controlling the bypass valve 13, thereby adjusting the superheat of refrigerant entering the compressor unit 2.

Figure 3:
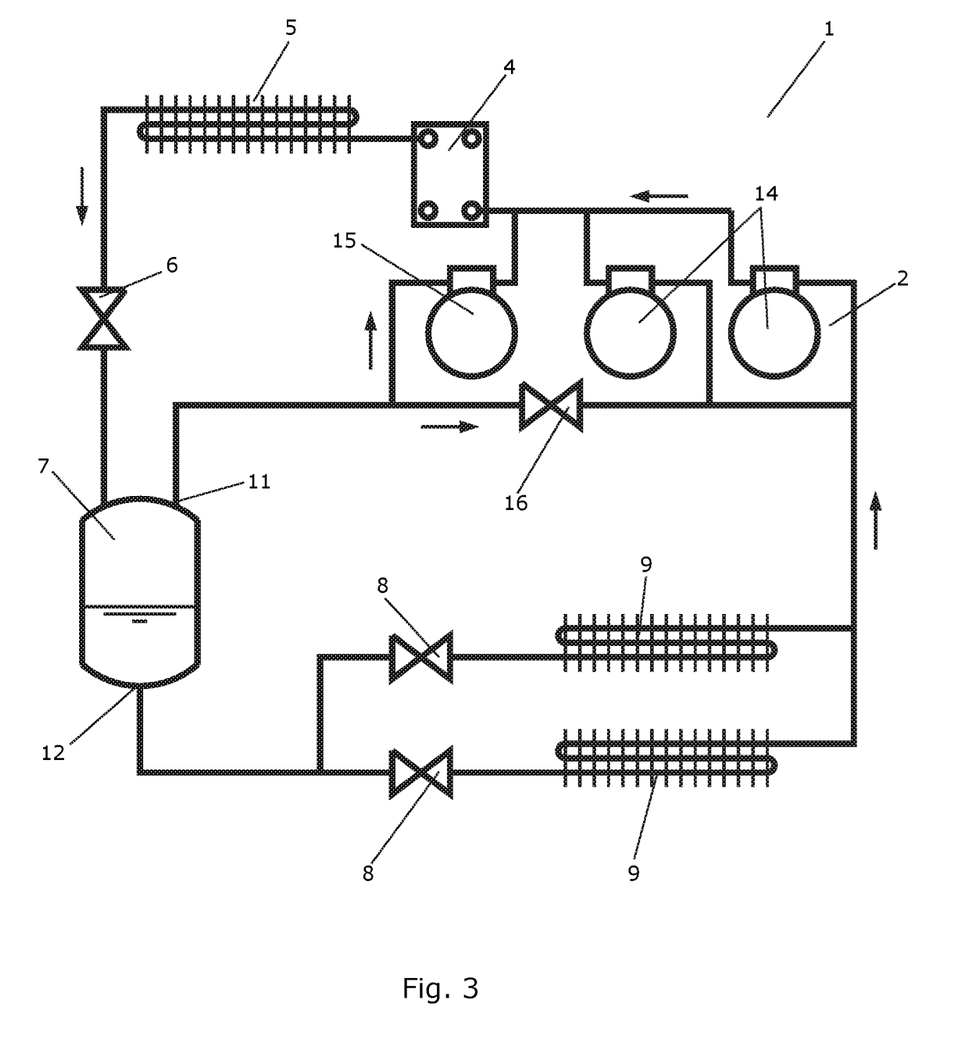

FIG. 3 is a diagrammatic view of another alternative vapour compression system 1 being operated according to an embodiment of the invention. The vapour compression system 1 of FIG. 3 is very similar to the vapour compression system 1 of FIG. 1, and it will therefore not be described in detail here.

In the vapour compression system 1 of FIG. 3 the compressor unit 2 comprises a number of main compressors 14, two of which are shown, and a number of receiver compressors 15, one of which is shown. Gaseous refrigerant leaving the receiver 7 via the gaseous outlet 11 is, as a rule, supplied to the receiver compressor 15. However, some or all of the gaseous refrigerant leaving the receiver 7 via the gaseous outlet 11 may be supplied to the main compressors 14 by appropriately controlling valve 16. Thereby the mass flow of refrigerant from the gaseous outlet 11 of the receiver 7 towards the part of the refrigerant path interconnecting the outlets of the evaporators 9 and the inlet of the compressor unit 2, and thereby towards the inlets of the main compressors 14, can be adjusted.

Thus, in the vapour compression system 1 of FIG. 3 the level of recovered heat provided by the heat recovery heat exchanger 4 to the heat recovery system can be adjusted by controlling the valve 16, thereby adjusting the mass flow of refrigerant from the gaseous outlet 11 of the receiver 7 towards the part of the refrigerant path which interconnects the outlets of the evaporators 9 and the inlet of the compressor unit 2, and thereby towards the inlets of the main compressors 14.

FIGS. 4-7 are logP-h diagrams illustrating a method of operating a vapour compression system according to various embodiments of the invention. The vapour compression system may, e.g., be one of the vapour compression systems shown in FIGS. 1-3.

Figure 4:
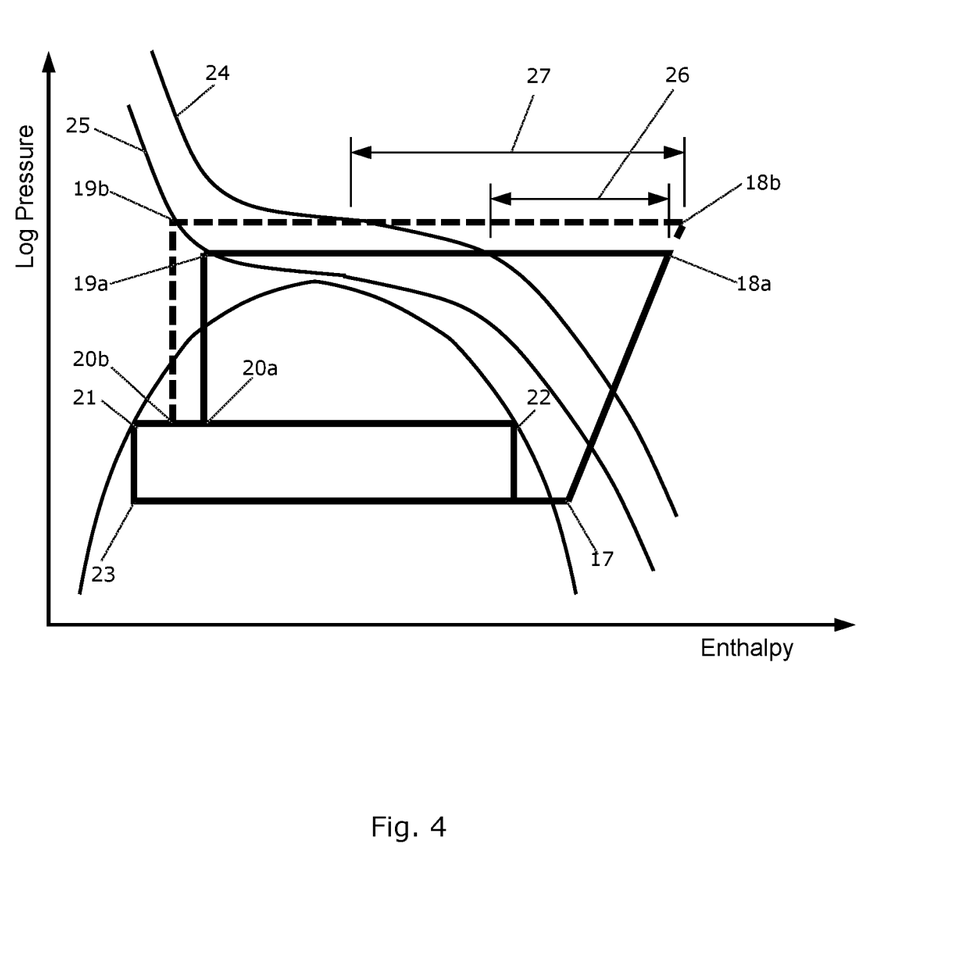
FIGS. 4-7 are logP-h diagrams illustrating methods according to various embodiments of the invention.

The logP-h diagram of FIG. 4 illustrates how a level of recovered heat can be adjusted by adjusting a pressure prevailing inside the heat rejecting heat exchanger. The solid lines represent enthalpy and pressure for a refrigerant circulating the refrigerant path of the vapour compression system during normal operation, i.e. when the vapour compression system is operated in order to optimize only the refrigerating part of the vapour compression system. The dashed lines represent enthalpy and pressure of the refrigerant when the pressure prevailing inside the heat rejecting heat exchanger is increased, as compared to normal operation.

Point 17 corresponds to the inlet of the compressor unit, points 18a and 18b correspond to the outlet of the compressor unit, points 19a and 19b correspond to the outlet of the heat rejecting heat exchanger, points 20a and 20b correspond to the inlet of the receiver 7, point 21 corresponds to the liquid outlet of the receiver, point 22 corresponds to the gaseous outlet of the receiver, and point 23 corresponds to the inlet of the evaporator. Line 24 is an isothermal line representing the lowest possible temperature of refrigerant leaving the heat recovery heat exchanger, and line 25 is an isothermal line representing the lowest possible temperature of refrigerant leaving the heat rejecting heat exchanger.

The refrigerant leaving the compressor unit passes through the heat recovery heat exchanger, and subsequently through the heat rejecting heat exchanger. The heat exchange taking place in the heat recovery heat exchanger and the heat rejecting heat exchanger, respectively, causes a decrease in the enthalpy of the refrigerant, as illustrated in the logP-h diagram. Passing through the heat recovery heat exchanger, the enthalpy of the refrigerant can only decrease to the point where the enthalpy of the refrigerant is equal to the enthalpy of the isothermal line 24 at the pressure of the refrigerant. Accordingly, arrow 26 represents the maximum recoverable heat per unit mass provided by the heat recovery heat exchanger to the heat recovery system, during normal operation of the vapour compression system.

However, when the pressure prevailing in the heat rejecting heat exchanger is increased, the maximum recoverable heat per unit mass is also increased, as illustrated by arrow 27, because the enthalpy of the refrigerant entering the heat recovery heat exchanger is higher, and because the enthalpy of the isothermal line 24 is lower at the increased pressure.

Thus, the level of recovered heat supplied by the heat recovery heat exchanger to the heat recovery system can be adjusted by appropriately adjusting the pressure prevailing in the heat rejecting heat exchanger. Furthermore, if a specific level of recovered heat is requested, corresponding to a specific length of the arrow 27, it is possible to derive or calculate a pressure value which results in the requested level of heat recovery being obtained.

Figure 5:
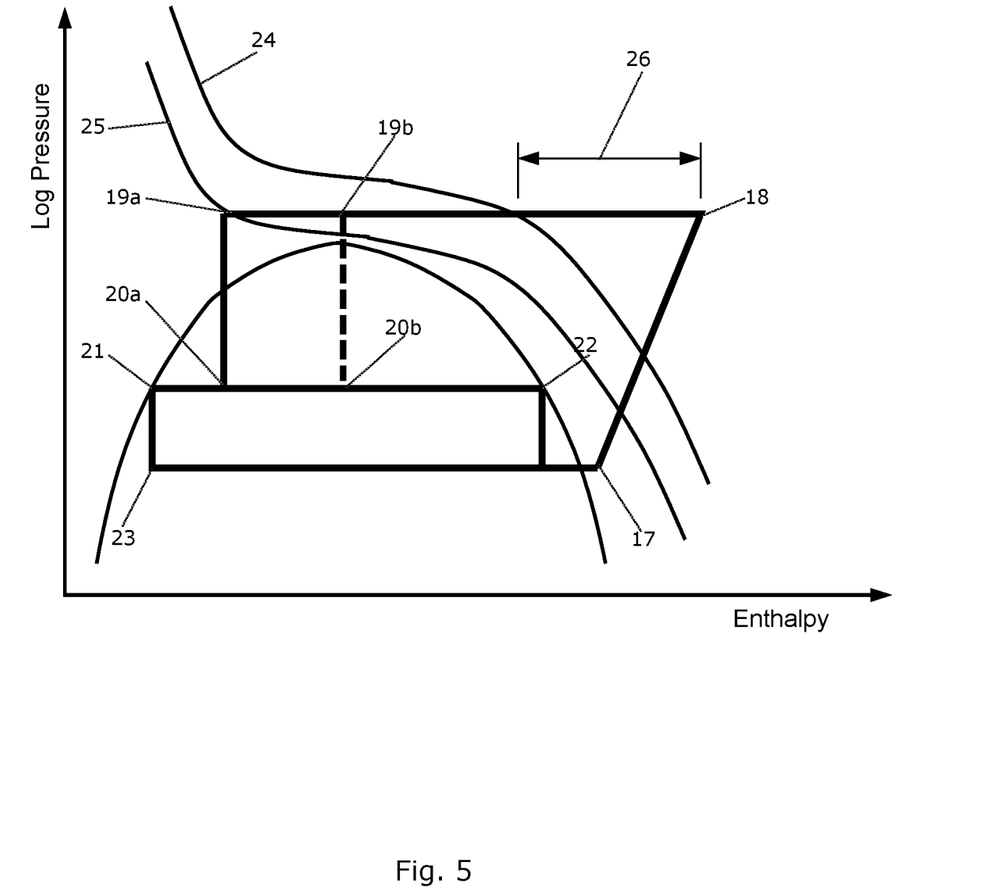

The logP-h diagram of FIG. 5 illustrates how a level of recovered heat can be adjusted by adjusting a temperature of refrigerant leaving the heat rejecting heat exchanger. The solid lines represent enthalpy and pressure for a refrigerant circulating the refrigerant path of the vapour compression system during normal operation, i.e. when the vapour compression system is operated in order to optimize only the refrigerating part of the vapour compression system. The dashed lines represent enthalpy and pressure of the refrigerant when the temperature of refrigerant leaving the heat rejecting heat exchanger is increased, as compared to normal operation.

It appears from the logP-h diagram of FIG. 5 that the maximum recoverable heat per unit mass, illustrated by arrow 26, is not affected by a change in the temperature of the refrigerant leaving the heat rejecting heat exchanger. However, the increased temperature causes a decrease in the cooling capacity of the refrigerant per unit mass, and therefore the mass flow rate of refrigerant circulating the vapour compression system increases. Accordingly, the level of recovered heat provided by the heat recovery heat exchanger to the heat recovery system is increased.

Figure 6:
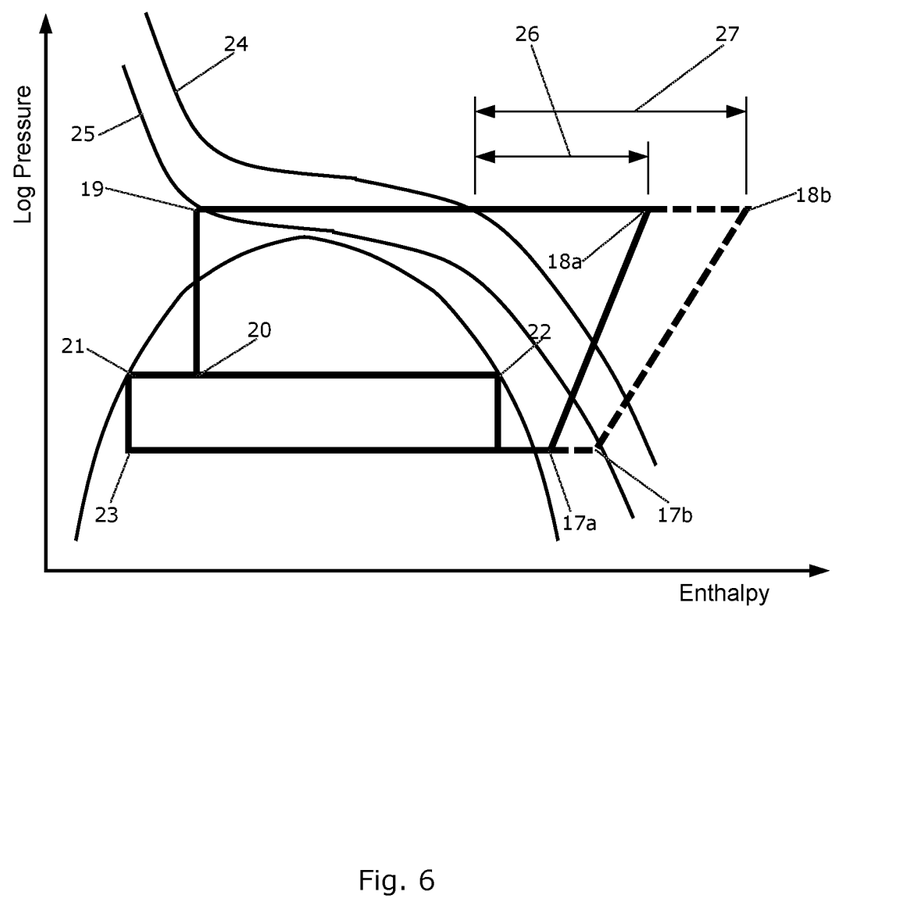

The logp-h diagram of FIG. 6 illustrates how a level of recovered heat can be adjusted by adjusting a superheat of refrigerant entering the compressor unit. The solid lines represent enthalpy and pressure for a refrigerant circulating the refrigerant path of the vapour compression system during normal operation, i.e. when the vapour compression system is operated in order to optimize only the refrigerating part of the vapour compression system. The dashed lines represent enthalpy and pressure of the refrigerant when the superheat of the refrigerant entering the compressor unit is increased. This may, e.g., be obtained by decreasing a bypass flow from the liquid outlet of the receiver towards the part of the refrigerant path which interconnects the outlet of the evaporator and the inlet of the compressor unit, as described above. Thus, the vapour compression system may advantageously be of the kind illustrated in FIG. 2.

It appears from the logP-h diagram of FIG. 6 that an increase in the superheat of the refrigerant entering the compressor unit results in an increase in the enthalpy of the refrigerant entering the compressor unit, as well as in an increase in the enthalpy of the refrigerant leaving the compressor unit and entering the heat recovery heat exchanger. This results in an increase in the maximum recoverable heat per unit mass, illustrated by arrow 27, as compared to the maximum recoverable heat per unit mass, illustrated by arrow 26, under normal operating conditions.

Thus, the level of recovered heat supplied by the heat recovery heat exchanger to the heat recovery system can be adjusted by appropriately adjusting the superheat of refrigerant entering the compressor unit. Furthermore, if a specific level of recovered heat is requested, corresponding to a specific length of the arrow 27, it is possible to derive or calculate a superheat value which results in the requested level of heat recovery being obtained.

Figure 7:
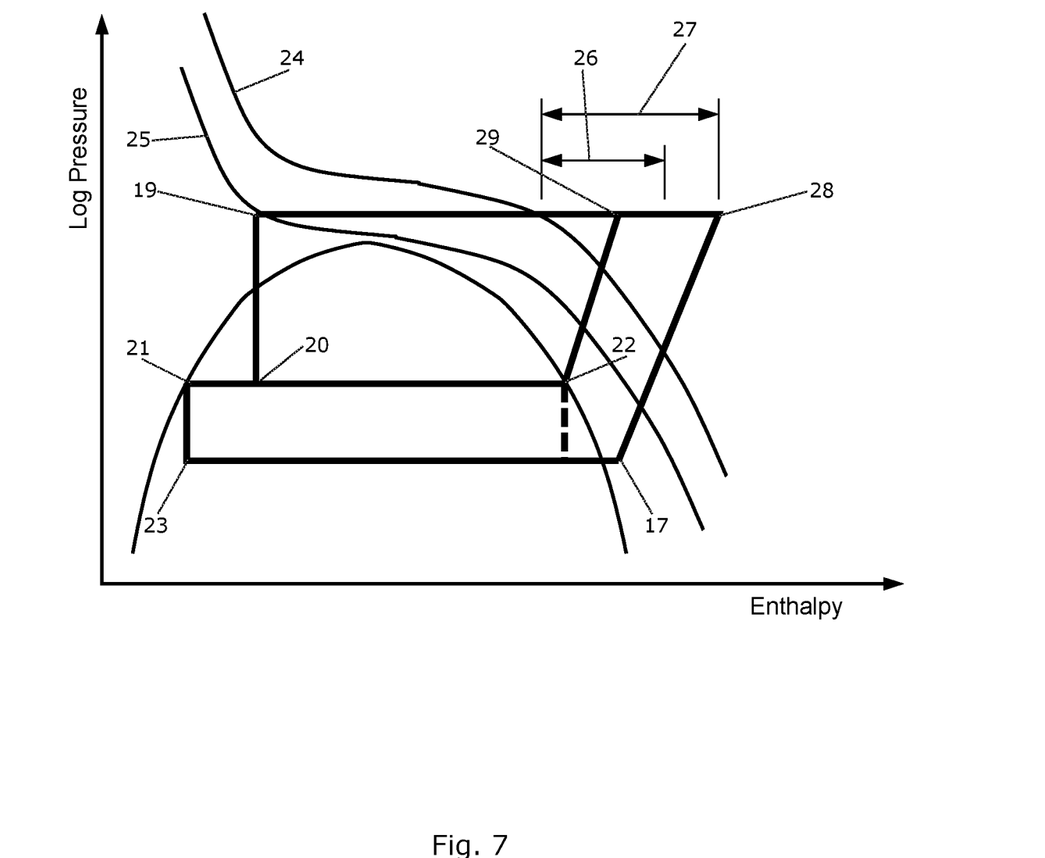

The logP-h diagram of FIG. 7 illustrates how a level of recovered heat can be adjusted by adjusting a mass flow of refrigerant from the gaseous outlet of the receiver towards the part of the refrigerant path which interconnects the outlet of the evaporator and the inlet of the compressor unit. The solid lines represent enthalpy and pressure for a refrigerant circulating the refrigerant path of the vapour compression system during normal operation, i.e. when the vapour compression system is operated in order to optimize only the refrigerating part of the vapour compression system. The dashed line represents that a larger portion of refrigerant is supplied from the gaseous outlet of the receiver to the part of the refrigerant path which interconnects the outlet of the evaporator and the inlet of the compressor unit.

The vapour compression system is of a kind where the compressor unit comprises one or more main compressors, arranged to compress refrigerant received from the outlet of the evaporator, and one or more receiver compressors, arranged to compress refrigerant received from the gaseous outlet of the receiver. Thus, the vapour compression system may advantageously be of the kind illustrated in FIG. 3.

In the logP-h diagram of FIG. 7 the point 28 corresponds to the outlet of the main compressor(s) and point 29 corresponds to the outlet of the receiver compressor(s). It appears from the logP-h diagram of FIG. 7 that the enthalpy of the refrigerant leaving the main compressor(s) is higher than the enthalpy of the refrigerant leaving the receiver compressor(s). The refrigerant leaving the main compressor(s) is mixed with the refrigerant leaving the receiver compressor(s) before the refrigerant is supplied to the heat recovery heat exchanger. Therefore, the enthalpy of the refrigerant being supplied to the heat recovery heat exchanger is at a level between the enthalpy of the refrigerant leaving the receiver compressor(s) and the enthalpy of the refrigerant leaving the main compressor(s). The exact level depends on how large a portion of the refrigerant being supplied to the heat recovery heat exchanger is received from the receiver compressor(s), and how large a portion is received from the main compressor(s). Accordingly, this distribution affects the maximum recoverable heat provided by the heat recovery heat exchanger to the heat recovery system, as illustrated by arrows 26 and 27.

Accordingly, by controlling to which extent the gaseous refrigerant leaving the receiver is supplied to the receiver compressor(s) or to the main compressor(s), the maximum recoverable heat per unit mass can be adjusted. This may, e.g., be obtained by controlling a valve which directs the gaseous refrigerant from the gaseous outlet of the receiver towards the part of the refrigerant path which interconnects the outlet of the evaporator and the inlet of the compressor unit, and thereby towards the main compressor(s), instead of towards the receiver compressor(s).

Thus, the level of recovered heat provided by the heat recovery heat exchanger to the heat recovery system can be adjusted by controlling a valve which controls a mass flow of refrigerant from the gaseous outlet of the receiver towards the part of the refrigerant path which interconnects the outlet of the evaporator and the inlet of the compressor unit, thereby adjusting this mass flow of refrigerant.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A method for operating a vapour compression system, the vapour compression system comprising a compressor unit comprising one or more compressors, a heat recovery heat exchanger, a heat rejecting heat exchanger, an expansion device and an evaporator arranged along a refrigerant path, the heat recovery heat exchanger being arranged to recover heat from refrigerant flowing in the refrigerant path and to provide the recovered heat to a heat recovery system, the method comprising the steps of:
the heat recovery system requesting a required level of recovered heat to be provided by the heat recovery heat exchanger to the heat recovery system, generating a signal indicating the required level of recovered heat, and supplying the generated signal to a control unit of the vapour compression system,
calculating a setpoint value for at least one control parameter of the vapour compression system, based on the generated signal, and
operating the vapour compression system in accordance with the calculated setpoint value(s),
wherein the required level of recovered heat includes a value indicating an amount of heat.

2. The method according to claim 1, wherein one of the control parameter(s) is a pressure prevailing inside the heat rejecting heat exchanger, and wherein the step of operating the vapour compression system comprises operating the vapour compression system in order to adjust the pressure prevailing inside the heat rejecting heat exchanger to reach a pressure which is equal to the calculated setpoint value for the pressure prevailing inside the heat rejecting heat exchanger.

3. The method according to claim 2, wherein one of the control parameter(s) is a temperature of refrigerant leaving the heat rejecting heat exchanger, and wherein the step of operating the vapour compression system comprises operating the vapour compression system in order to adjust the temperature of refrigerant leaving the heat rejecting heat exchanger to reach a temperature which is equal to the calculated setpoint value for the temperature of refrigerant leaving the heat rejecting heat exchanger.

4. The method according to claim 2, wherein one of the control parameter(s) is a superheat of refrigerant entering the compressor unit, and wherein the step of operating the vapour compression system comprises operating the vapour compression system in order to adjust the superheat of refrigerant entering the compressor unit to reach a superheat value which is equal to the calculated setpoint value for the superheat of refrigerant entering the compressor unit.

5. The method according to claim 2, wherein the step of the heat recovery system requesting the required level of recovered heat comprises generating a signal indicating a fraction of a maximum available recoverable heat under maximum refrigeration load conditions, corresponding to the required level of recovered heat.

6. The method according to claim 2, wherein the step of calculating the setpoint value comprises establishing a model of a part of the vapour compression system which is related to the at least one control parameter, and calculating the setpoint value using the established model, and wherein the model reflects a relationship between the at least one control parameter and a level of recovered heat.

7. The method according to claim 1, wherein one of the control parameter(s) is a temperature of refrigerant leaving the heat rejecting heat exchanger, and wherein the step of operating the vapour compression system comprises operating the vapour compression system in order to adjust the temperature of refrigerant leaving the heat rejecting heat exchanger to reach a temperature which is equal to the calculated setpoint value for the temperature of refrigerant leaving the heat rejecting heat exchanger.

8. The method according to claim 7, wherein one of the control parameter(s) is a superheat of refrigerant entering the compressor unit, and wherein the step of operating the vapour compression system comprises operating the vapour compression system in order to adjust the superheat of refrigerant entering the compressor unit to reach a superheat value which is equal to the calculated setpoint value for the superheat of refrigerant entering the compressor unit.

9. The method according to claim 7, wherein the step of the heat recovery system requesting a required level of recovered heat comprises generating a signal indicating a fraction of a maximum available recoverable heat under maximum refrigeration load conditions, corresponding to the required level of recovered heat.

10. The method according to claim 7, wherein the step of calculating the setpoint value comprises establishing a model of a part of the vapour compression system which is related to the control parameter(s), and calculating the setpoint value using the established model.

11. The method according to claim 1, wherein one of the control parameter(s) is a superheat of refrigerant entering the compressor unit, and wherein the step of operating the vapour compression system comprises operating the vapour compression system in order to adjust the superheat of refrigerant entering the compressor unit to reach a superheat value which is equal to the calculated setpoint value for the superheat of refrigerant entering the compressor unit.

12. The method according to claim 11, wherein the step of the heat recovery system requesting a required level of recovered heat comprises generating a signal indicating a fraction of a maximum available recoverable heat under maximum refrigeration load conditions, corresponding to the required level of recovered heat.

13. The method according to claim 11, wherein the step of calculating the setpoint value comprises establishing a model of a part of the vapour compression system which is related to the control parameter(s), and calculating the setpoint value using the established model.

14. The method according to claim 1, wherein the step of the heat recovery system requesting the required level of recovered heat comprises generating a signal indicating a fraction of a maximum available recoverable heat under maximum refrigeration load conditions, corresponding to the required level of recovered heat.

15. The method according to claim 1, wherein the step of calculating the setpoint value comprises establishing a model of a part of the vapour compression system which is related to the at least one control parameter, and calculating the setpoint value using the established model, and wherein the model reflects a relationship between the at least one control parameter and a level of recovered heat.

16. The method according to claim 1, wherein the step of calculating the setpoint value comprises the steps of:
    calculating a mass flow rate through the compressor unit,
    calculating an enthalpy per unit mass required in order to provide the requested level of recovered heat, at the calculated mass flow rate through the compressor unit, and calculating the setpoint value for at least one control parameter which provides the calculated enthalpy per unit mass.

17. The method according to claim 1, the vapour compression system further comprising a receiver having an inlet connected to an outlet of the heat rejecting heat exchanger, a gaseous outlet and a liquid outlet, and wherein the compressor unit comprises one or more compressors having an inlet connected to an outlet of the evaporator and one or more compressors having an inlet connected to the gaseous outlet of the receiver, the gaseous outlet of the receiver further being connectable to a part of the refrigerant path interconnecting the outlet of the evaporator and the inlet of the compressor unit, via a bypass valve, wherein the method further comprises the steps of:
    calculating the setpoint value for a mass flow of refrigerant from the gaseous outlet of the receiver towards the part of the refrigerant path interconnecting the outlet of the evaporator and the inlet of the compressor unit, based on the generated signal, and operating the bypass valve in accordance with the calculated setpoint value for the mass flow of refrigerant.

* * * * *